(12) United States Patent
Choi

(10) Patent No.: US 8,166,775 B2
(45) Date of Patent: *May 1, 2012

(54) NOISE ATTENUATING DEVICE FOR A HEATING-VENTILATION-COOLING SYSTEM OF A MOTOR VEHICLE

(75) Inventor: Michael Choi, Garden City, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2088 days.

This patent is subject to a terminal disclaimer.

(21) Appl. No.: 10/683,600

(22) Filed: Oct. 9, 2003

(65) Prior Publication Data

US 2005/0076668 A1    Apr. 14, 2005

(51) Int. Cl.
*F25D 17/06*    (2006.01)
*F25D 19/00*    (2006.01)
*E06B 7/02*    (2006.01)
*E04F 17/04*    (2006.01)

(52) U.S. Cl. ............ 62/426; 62/296; 454/206; 181/224

(58) Field of Classification Search ............ 62/404, 62/426, 296; 454/206, 906; 181/224, 225
See application file for complete search history.

(56) References Cited

U.S. PATENT DOCUMENTS

| | | | |
|---|---|---|---|
| 3,686,893 | A | 8/1972 | Edwards |
| 3,895,686 | A | 7/1975 | Savkar et al. |
| 4,109,750 | A | 8/1978 | Wirt |
| 4,127,183 | A | 11/1978 | McLarty |
| 4,167,986 | A | 9/1979 | Conway |
| 4,362,223 | A | 12/1982 | Meier |
| 4,957,036 | A | 9/1990 | Fujihara et al. |
| 5,405,106 | A | 4/1995 | Chintamani et al. |
| 5,722,357 | A | 3/1998 | Choi |
| 5,728,980 | A | 3/1998 | Zarnick |
| 5,758,614 | A | 6/1998 | Choi |
| 5,924,398 | A | 7/1999 | Choi |
| 6,078,671 | A * | 6/2000 | Kawanishi et al. .......... 381/71.5 |
| 2005/0045419 | A1* | 3/2005 | Choi et al. .................... 181/270 |
| 2005/0645418 | * | 3/2005 | Choi et al. .................... 181/270 |

* cited by examiner

*Primary Examiner* — Chen Wen Jiang
(74) *Attorney, Agent, or Firm* — Allan J. Lippa; Alleman Hall McCoy Russell & Tuttle LLP

(57) ABSTRACT

A system and method for reducing noise in an automotive heating, ventilation, and cooling system is described. A noise attenuation device using radial vanes upstream of a flow discontinuity, such as a bend in the ducting, and downstream of a blower fan is used to reduce noise.

4 Claims, 2 Drawing Sheets

NOISE ATTENUATING DEVICE FOR A HEATING-VENTILATION-COOLING SYSTEM OF A MOTOR VEHICLE

FIELD OF THE INVENTION

The field of the invention relates to reducing noise caused by turbulent air flow in a climate control system of a passenger vehicle traveling on the road.

BACKGROUND AND SUMMARY OF THE INVENTION

Various methods have been applied to reduce noise in air ducts of a passenger vehicle. One approach attempts to improve the grill on an instrument panel of the vehicle, as described in U.S. Pat. No. 4,957,036.

The inventors herein have recognized a disadvantage with prior art noise reduction systems for climate control systems of passenger vehicles. Specifically, such system can have duct systems with significant amounts of bending, or other discontinuities, so that the system can be packaged into the vehicle. This is especially true with more modern vehicle designs where space outside the passenger compartment is at a premium. Air flowing around these bends, or through other discontinuities, can produce noise due to turbulent air flow caused by a blower fan. In one example, this can noise can be due to impingement from turbulence on the discontinuities. This noise can be bothersome to customers, especially during high fan speed operation, or when the fan is first turning on.

Note that various types of discontinuities can be encountered, such as (i) a bend in a duct, (ii) an irregular flow path surface at a coupling between two ducts, (iii) a change in the diameter of a duct, (iv) an air filter, or (v) any other flow restriction in the exhaust pipe portion.

To overcome these disadvantages, a set of radial vanes can be used in the climate control system ducts upstream of the bends or discontinuities. In this way, it is possible to reduce the turbulence of the flow around the bends or discontinuities, thereby reducing the noise.

An advantage of the radial vanes is that they can be, in one example, integrally molded into the plastic ducts of the climate control system, thereby allowing ease in manufacturing with low cost.

Another advantage of the present invention is that it can reduce impingement or flow noise generated by flow turbulence contacting a discontinuity in the duct system. Thus, it can reduce turbulence upstream of a discontinuity or bend in ducts to reduce impingement or flow noise generated turbulent flow, generated from the fan, contacting the discontinuity in system.

DETAILED DESCRIPTION OF EXAMPLE EMBODIMENTS OF THE INVENTION

Figure 1:
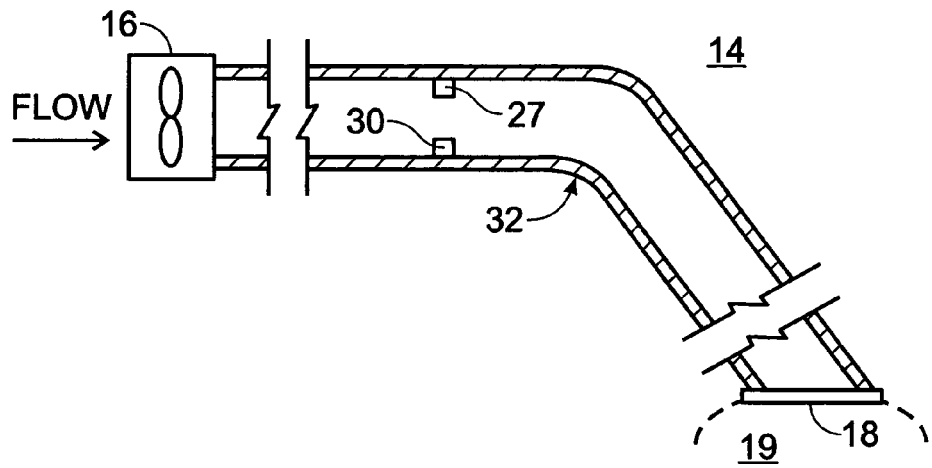
FIG. 1 is a schematic of a portion of vehicle's heating, ventilating, and cooling system.

Referring now to the drawings, like reference numerals are used to identify identical components in the various views.

As will explained in greater detail below, the inventors herein have recognized that airflow in a heating and ventilation and air-conditioning (HVAC) system of an automotive vehicle, propagating to a discontinuity in the ducts system, can generate undesirable noise, such as impingement or flow noise. Accordingly, the present invention is directed to noise attenuation devices, described below, that reduce the impingement or flow noise in system 14. Note that that the system 14 may alternatively be simply a heating system, or simply an air-conditioning system of an automotive vehicle.

HVAC system 14 includes duct 27, which can be a plastic duct. Further, radial Vanes 30 are shown in duct 27. As described in more detail below, vanes 30 can also be plastic and integrally molded into duct 27, in one example. The ducts with vanes can be manufactured by injection molding or lost core molding. FIG. 1 also shows bend 32, as one example discontinuity. Further, blower fan 16 is shown upstream of vanes 30 and bend 32. As will be described in more detail below, radial vanes 30 can be used to reduce noise caused by air flowing through system 14. Further, outlet plate 18 is shown where HVAC flow enters passenger compartment 19 of the vehicle. Note that the noise attenuation devices of the present invention can also advantageously reduce noise generated by flow exiting HVAC 14 and entering compartment 19. For example, such an exiting location is another example of a discontinuity. Also, by reducing noise at an upstream bend (or other discontinuity), this can reduce the noise transmitted though outlet plate 18.

Figure 2:
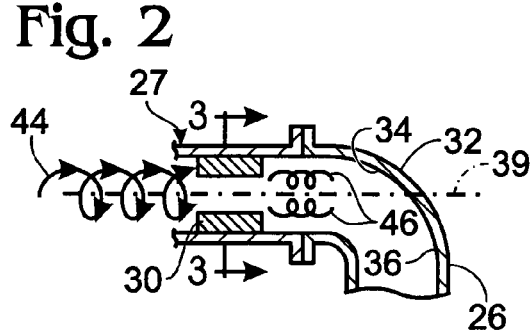
FIG. 2 is a sectional view of a first embodiment of a noise attenuation device in accordance with the present invention disposed upstream of a bend in a system of FIG. 1.
Figure 3:
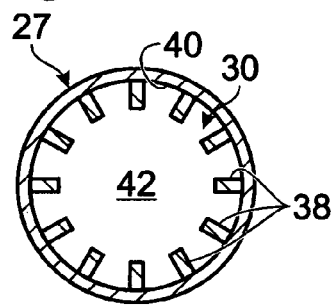
FIG. 3 is an enlarged cross-sectional view of the noise attenuation device of FIG. 2.

Referring to FIGS. 2 and 3, an example noise attenuation device 30 is provided for reducing noise in system 14. As shown, device 30 may be disposed upstream of a bend 32 in pipe section 27. The bend 32 may be approximately 90°, or 30-90°, or 40-70°, or anywhere in this range. Further, it creates an impingement surface between points 34 and 36 where flow pulses may generate, in one example, impingement noise. Alternatively, turbulent flow can generate noise when flowing through bend 32.

Referring to FIG. 3, device 30 may include a plurality of vanes 38 extending inwardly from a tubular wall 40 of duct 27 into an aperture 42 defined by wall 40. The plurality of vanes 38 may be formed of the same metal as section 27, in the case where duct 27 is made from metal. Alternatively, as discussed above, both duct 27 and vanes 38 can be comprised of a similar plastic, where they are separately molded and attached together via any of: glue, an interference fit, or sonically welded.

As shown, vanes 38 may extend from a predetermined axial position on axis 39 a predetermined axial distance and extend inwardly from wall 40 a predetermined distance into aperture 42. The number, shape, axial length, inwardly extending distance, thickness, and orientation of the vanes 38 may be varied based on desired noise dampening characteristics of device 30.

In an alternate embodiment (not shown), noise attenuation device 30 can have vanes formed as punched out tabs of duct 27. Further, a collar can be disposed around duct 27 covering the holes in section 27 proximate to the punched out tabs. In another alternate embodiment, device 30 could be formed as a ring of metal having punched out tabs that form vanes 38. The ring could be affixed within the duct to form device 30.

Referring again to FIGS. 2 and 3, the noise dampening characteristics of device 30 will now be explained. As shown, an pulse 44, or other turbulence, may propagate down section 27 in a generally vortex pattern to vanes 38. When the relatively large pulse 44 passes by vanes 38, vanes 38 disperse the pulse 44 into a plurality of pulses 46 spread out over a wider area in duct section 26. Thus, the pulses that contact bend 32 are dispersed over a wider area of section 26 that reduces the amount of noise generated at bend 32 by the pulses. Further, adjacent ones of vanes 38 may form downstream pulses with vortex flow patterns that rotate in opposite directions with respect to one another. The counter-rotating vortexes can interact with each other to reduce turbulence in the gases prior to the gases contacting bend 32. The reduced turbulence reduces the noise generated by the gases contacting bend 32.

Figure 4:
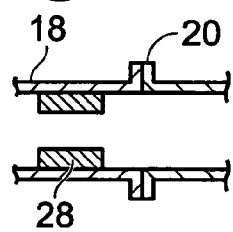
FIG. 4 is a sectional view of a first embodiment of the noise attenuation device disposed upstream of a connection shown in FIG. 1.

Referring to FIGS. 1 and 4, a noise attenuation device 28 may also be utilized upstream of a discontinuity such as a duct connection 20. As shown, device 28 may have an identical structure as device 30. Device 28 is placed upstream of connection 20 to decrease the magnitude of the noise generated by gas pulses contacting potentially uneven surfaces at connection 20.

Referring to FIGS. 5-17, several alternate embodiments of noise-attenuating devices or air-diffusers are shown. Each embodiment may be disposed upstream of a discontinuity in system 14 to reduce noise generated therein. Each embodiment may be constructed from steel, high temperature plastic, cast aluminum, die-cast aluminum, or ceramic, or combinations thereof. Further, the number, shape, axial length, inwardly extending distance, thickness, and orientation of the vanes of each embodiment may be varied based on desired flow characteristics and noise damping characteristics the devices. Further, multiple noise attenuating device can be used on multiple locations in HVAC system 14. For example, an attenuating device can be placed downstream of blower fan 14, but upstream of multiple discontinuities. Also, some discontinuities can have an upstream attenuator, while others do not.

Figure 5:
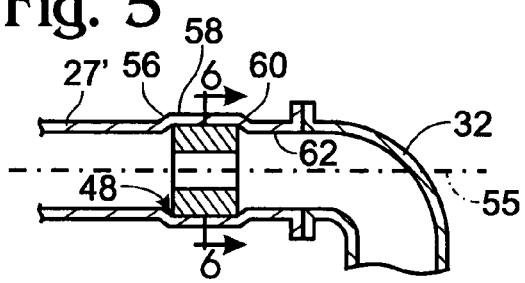
FIG. 5 is a sectional view of a second embodiment of a noise attenuation device in accordance with the present invention disposed upstream of a bend in a system of FIG. 4.
Figure 7:
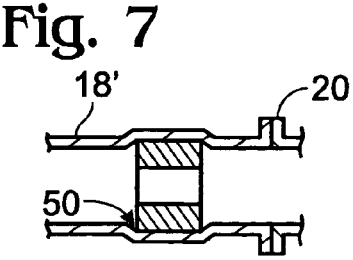
FIG. 7 is a sectional view of the second embodiment of the noise attenuation device disposed upstream of a connection.

Referring to FIGS. 5 and 7, a second embodiment of the present invention is shown in noise attenuation devices 48, 50. A difference between devices 48, 50 and device 30 is that devices 48, 50 are separate components that can be affixed within system 14 instead of being formed integral within duct sections of HVAC system 14. Referring to FIG. 5, device 48 may be utilized to reduce turbulence in exhaust gases upstream of bend 32 to reduce the noise, such as impingement noise, generated by gases contacting bend 32. Similarly, referring to FIG. 7, device 50 may be utilized to reduce turbulence in gases upstream of connection 20 to reduce noise, such as impingement noise, generated by gases passing through connection 20.

Figure 6:
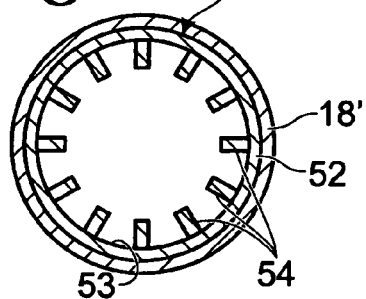
FIG. 6 is an enlarged cross-sectional view of the second embodiment of the noise attenuation device disposed upstream of a bend in a system of FIG. 5.

Referring to FIGS. 5 and 6, device 48 may include a tubular wall 52 and a plurality of vanes 52 extending inwardly from wall 52 a predetermined distance into an aperture 53. Further, vanes 54 may extend from a predetermined axial position on axis 55 a predetermined axial distance. For example, each of vanes 52 may extend inwardly 10-15 mm from wall 52 and have a thickness of 1.5 mm and an axial length of 10-15 mm. Further, vanes 52 may be spaced about an inner circumference of wall 52 equidistant from one another. For example, vanes 52 may be spaced 10 mm from each other about the inner circumference of wall 52. Alternatively, they can be located at non-equidistant from one another.

As shown, tubular duct section 27' may have an inner diameter suitable for allowing device 48 to be press-fit within the opening defined by the section 27'. Section 27' may include formed portions 56, 58, 60—produced by a conventional roll-forming process—for affixing device 48 in exhaust system 14. In particular, portions 56, 58 can initially be formed using the conventional roll-forming process. Next, device 48 may be press-fit within portion 58. Next, portions 60, 62 can be formed using the conventional roll-forming process to affix device 48 within exhaust pipe section 27'.

In an embodiment where duct 27 and vanes 52 are plastic, the structure can be formed as injection molding or lost core molding.

In the following figures, additional alternative embodiments are described. As in each of the embodiments described above, the noise-attenuating device can be formed of plastic either separately, or integrally, with duct 27.

Figure 8:
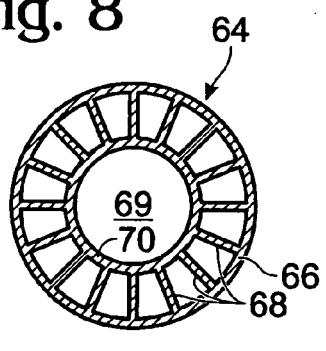
FIG. 8 is a cross-sectional view of a third embodiment of a noise attenuation device in accordance with the present invention.

Referring to FIG. 8, a cross-sectional view of a third embodiment of the present invention is shown as noise attenuation device 64. Device 64 may be disposed upstream of a discontinuity in system 14 to reduce noise, such as impingement or flow noise. As shown, device 64 may include a tubular wall 66 and a plurality of vanes 68 extending radially inwardly from wall 66 into an aperture 69 defined by wall 66. Further, vanes 68 may extend inwardly a predetermined distance and be affixed to an internal ring 70. Further, wall 66, vanes 68, and ring 70 may extend from a predetermined axial position a predetermined axial distance. Device 64 may be press-fit within system 14 as described above with respect to devices 48, 50. In an alternate embodiment (not shown), vanes 68 could be formed integrally within an duct section instead of being attached to wall 66.

Figure 9:
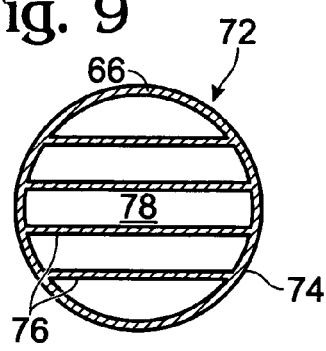
FIG. 9 is a cross-sectional view of a fourth embodiment of a noise attenuation device in accordance with the present invention.

Referring to FIG. 9, a cross-sectional view of a fourth embodiment of the present invention is shown as noise attenuation device 72. Device 72 may be disposed upstream of a discontinuity in system 14 to reduce noise, such as impingement or flow noise. As shown, device 72 may include a tubular wall 74 having a plurality of vanes 76 extending across an aperture 78 defined by wall 74. Further, vanes 76 may be disposed parallel to one another across aperture 78. Device 72 may be press-fit within system 14 as described above with respect to devices 48, 50. In an alternate embodiment (not shown), vanes 78 could be directly integrally formed within a duct section instead of being attached to tubular wall 74.

Figure 10:
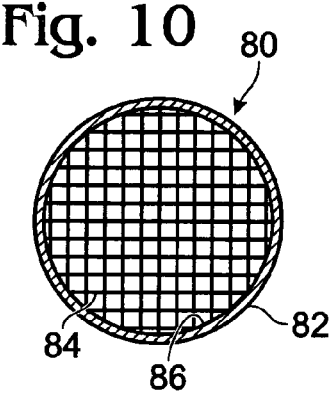
FIG. 10 is a cross-sectional view of a fifth embodiment of a noise attenuation device in accordance with the present invention.

Referring to FIG. 10, a cross-sectional view of a fifth embodiment of the present invention is shown as noise attenuation device 80. Device 80 may be disposed upstream of a discontinuity in system 14 to reduce noise, such as impingement or flow noise. Device 80 may include a tubular wall 82 and a wire mesh 84 extending across an aperture 86 defined by wall 82. Wire mesh 84 may be bonded to wall 82 using a high temperature adhesive or using other attachment means known to those skilled in the art. Device 80 may be press-fit within system 14 as described above with respect to devices 48, 50. In an alternate embodiment (not shown), wire mesh 84 could be directly coupled to an interior surface of a duct pipe section instead of being attached to tubular wall 82. Alternatively, 80 can be formed of a plastic or other polymeric material.

Figure 11:
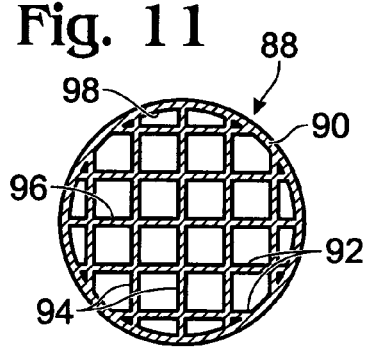
FIG. 11 is a cross-sectional view of a sixth embodiment of a noise attenuation device in accordance with the present invention.

Referring to FIG. 11, a cross-sectional view of a sixth embodiment of the present invention is shown as noise attenuation device 88. Device 88 may be disposed upstream of a discontinuity in system 14 to reduce noise, such as impingement or flow noise. Device 88 may include a tubular wall 90 and a plurality of horizontal vanes 92 and a plurality of vertical vanes 94 forming a honeycomb-shaped vane structure 96 within an aperture 98 defined by wall 90. Device 88 may be press-fit within system 14 as described above with respect to devices 48, 50. In an alternate embodiment (not shown), honeycomb-shaped vane structure 96 could be integrally formed within a duct section. Alternatively, device 88 can be formed of a plastic or other polymeric material.

Figure 12:
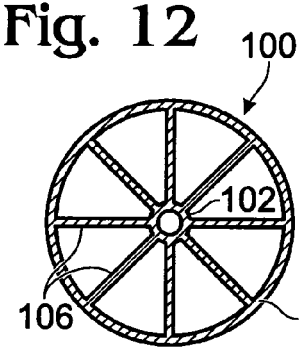
FIG. 12 is a cross-sectional view of a seventh embodiment of a noise attenuation device in accordance with the present invention.

Referring to FIG. 12, a cross-sectional view of a seventh embodiment of the present invention is shown as noise attenuation device 100. Device 100 may be disposed upstream of a discontinuity in system 14 to reduce noise, such as impingement or flow noise in a specified frequency range. For example, device 100 could be tuned to attenuate noise at different frequencies depending on the diameter of an inner ring 102. As shown, device 100 may include a tubular wall 104 and a plurality of vanes 106 extending radially inwardly from wall 104 a predetermined distance to inner ring 102. As shown, inner ring 102 has a diameter substantially smaller than the diameter of wall 104. Device 100 may be press-fit within system 14 as described above with respect to devices 48, 50. Alternatively, device 100 can be formed of a plastic or other polymeric material.

Figure 13:
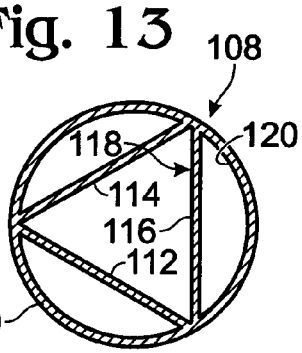
FIG. 13 is a cross-sectional view of an eighth embodiment of a noise attenuation device in accordance with the present invention.

Referring to FIG. 13, a cross-sectional view of an eighth embodiment of the present invention is shown as noise attenuation device 108. Device 108 may be disposed upstream of a discontinuity in system 14 to reduce noise, such as impingement or flow noise. Device 108 may include a tubular wall 110 and vanes 112, 114, 116 which form a triangular-shaped vane structure 118 within aperture 120 defined by wall 110. Device 108 may be press-fit within system 14 as described above with respect to devices 48, 50. In an alternate embodiment (not shown), triangular-shaped vane structure 118 could be integrally formed within a duct section. Alternatively, device 108 can be formed of a plastic or other polymeric material.

Figure 14:
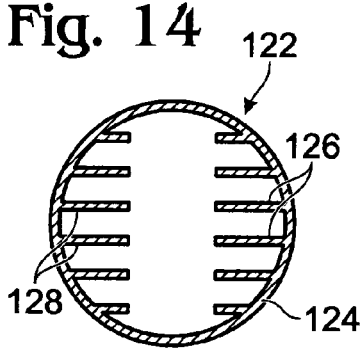
FIG. 14 is a cross-sectional view of a ninth embodiment of a noise attenuation device in accordance with the present invention.

Referring to FIG. 14, a cross-sectional view of an ninth embodiment of the present invention is shown as noise attenuation device 122. Device 122 may be disposed upstream of a discontinuity in system 14 to reduce noise, such as impingement or flow noise. Device 122 may include a tubular wall 124 and a first set of vanes 126 extending from a first portion of wall 124 inwardly in a first direction a predetermined distance. Each of the first set of vanes 126 being parallel to one another. Device 122 may further include a second set of vanes 128 extending from wall 122 inwardly in a second direction, opposite the first direction, a predetermined distance. Each of the second set of vanes 128 being parallel to one another. Device 122 may be press-fit within system 14 as described above with respect to devices 48, 50. In an alternate embodiment (not shown), first and second set of vanes 126, 128 could be integrally formed within a duct section. Alternatively, device 122 can be formed of a plastic or other polymeric material.

Figure 15:
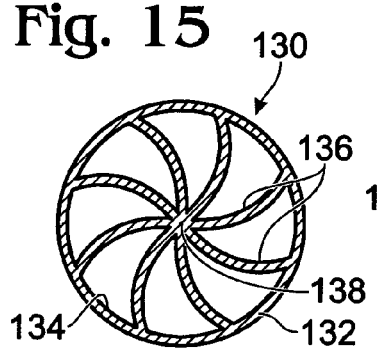
FIG. 15 is a cross-sectional view of a tenth embodiment of a noise attenuation device in accordance with the present invention.

Referring to FIG. 15, a cross-sectional view of a tenth embodiment of the present invention is shown as noise attenuation device 130. Device 130 may be disposed upstream of a discontinuity in system 14 to reduce noise, such as impingement or flow noise. Device 130 may include a tubular wall 132 defining an aperture 134. Device 130 may further include a plurality of S-shaped vanes 136 disposed within aperture 134 and coupled at each end to tubular wall 132. Each of the S-shaped vanes 136 are coupled together at a midpoint 138 which is located centrally in aperture 134. Device 130 may be press-fit within system 14 as described above with respect to devices 48, 50. In an alternate embodiment (not shown), vanes 136 could be integrally formed within a duct section. Alternatively, device 130 can be formed of a plastic or other polymeric material.

Figure 16:
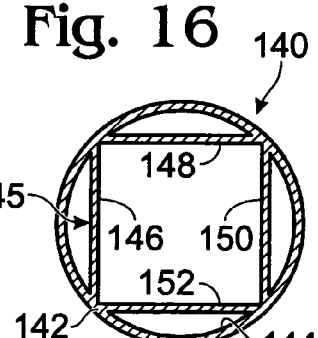
FIG. 16 is a cross-sectional view of an eleventh embodiment of a noise attenuation device in accordance with the present invention.

Referring to FIG. 16, a cross-sectional view of an eleventh embodiment of the present invention is shown as noise attenuation device 140. Device 140 may be disposed upstream of a discontinuity in system 14 to reduce noise, such as impingement or flow noise. Device 14 may include a tubular wall 142 defining an aperture 144. Device 140 may further include a rectangular vane structure 145 comprised of vanes 146, 148, 150, 152 disposed within aperture 144 and coupled to wall 142. Device 140 may be press-fit within system 14 as described above with respect to devices 48, 50. In an alternate embodiment (not shown), rectangular vane structure 145 could be integrally formed within a duct section. Alternatively, device 140 can be formed of a plastic or other polymeric material.

Figure 17:
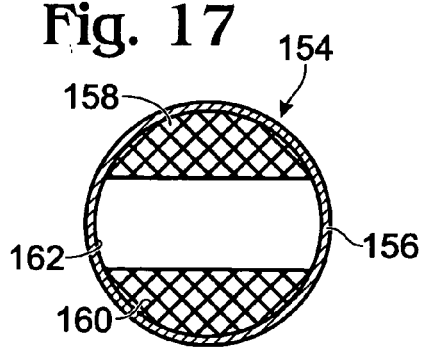
FIG. 17 is a cross-sectional view of a twelfth embodiment of a noise attenuation device in accordance with the present invention.

Referring to FIG. 17, a cross-sectional view of a twelfth embodiment of the present invention is shown as noise attenuation device 154. Device 154 may be disposed upstream of a discontinuity in system 14 to reduce noise, such as impingement or flow noise. Device 154 may include a tubular wall 156 and a first and second wire meshes 158, 160 disposed in an aperture 162 defined by wall 156. Wire mesh 158 may cover a first portion of aperture 162 and wire mesh 160 may cover a second portion of aperture 162 opposite the first portion of aperture 162. Wire meshes 158, 160 may be constructed from steel and bonded to wall 156 using a high temperature adhesive or using other attachment means known to those skilled in the art. Device 154 may be press-fit within system 14 as described above with respect to devices 48, 50. In an alternate embodiment (not shown), wire meshes 158, 160 could be directly coupled to an interior surface of a duct section instead of being attached to tubular wall 156. Alternatively, device 154 can be formed of a plastic or other polymeric material.

The inventive noise attenuation device and system described herein provide a substantial advantage over known systems. In particular, the inventive device and system can reduce noise, such as impingement or flow noise generated at any discontinuity in a vehicle HVAC system and reduce flow path noise generated at a duct of said system.

Note also that the inventive device and system can reduce flow path noise generated at an outlet of duct 26 in system 14. The vanes shows herein could also be used on the exit or outlet plate of the system, or just before the dashboard directing vanes adjusted by the vehicle operator.

I claim:

1. A method of operating a climate control system in a passenger vehicle traveling on the road, the method comprising:

directing a flow of air to a passenger compartment of the vehicle via a duct, where the duct has a bend and where a blower fan is coupled to said duct upstream of said bend and where a set of radial vanes is located in said duct; and operating the blower fan to generate said flow of air in said duct, where said radial vanes protrude inwardly into said flow of air in said duct, and said vanes are located downstream of said fan and upstream of said bend, said vanes reducing noise otherwise caused by air flowing around said bend.

2. The method of claim 1 wherein said duct and said vanes are made from a polymeric material, said vanes being integrally formed in said duct.

3. The method of claim 1 wherein said vanes are approximately 10 to 15 mm wide.

4. The method of claim 1 wherein said vanes protrude only partially into said duct and do not span across said duct.

* * * * *